US011783676B2

(12) United States Patent
Mariscal et al.

(10) Patent No.: US 11,783,676 B2
(45) **Date of Patent: *Oct. 10, 2023**

(54) GAMING MACHINE AND METHOD HAVING PERSISTENT CONTINUUM FEATURE

(71) Applicant: Everi Games, Inc., Austin, TX (US)

(72) Inventors: Juan Mariscal, Chicago, IL (US); Jason Yet-Fai Chan, Chicago, IL (US); Michael John Khoury, Jr., Fenton, MI (US)

(73) Assignee: Everi Games, Inc., Austin, TX (US)

( * ) Notice: Subject to any disclaimer, the term of this patent is extended or adjusted under 35 U.S.C. 154(b) by 96 days.

This patent is subject to a terminal disclaimer.

(21) Appl. No.: 17/498,712

(22) Filed: Oct. 11, 2021

(65) Prior Publication Data

US 2022/0028221 A1 Jan. 27, 2022

Related U.S. Application Data

(63) Continuation of application No. 16/706,683, filed on Dec. 7, 2019, now Pat. No. 11,151,843, which is a continuation of application No. 15/685,077, filed on Aug. 24, 2017, now Pat. No. 10,504,329.

(51) Int. Cl.
*A63F 9/24* (2006.01)
*A63F 13/00* (2014.01)
*G07F 17/32* (2006.01)

(52) U.S. Cl.
CPC ...... *G07F 17/3267* (2013.01); *G07F 17/3209* (2013.01); *G07F 17/3211* (2013.01); *G07F 17/3288* (2013.01)

(58) Field of Classification Search
None
See application file for complete search history.

(56) References Cited

U.S. PATENT DOCUMENTS

| | | | |
|---|---|---|---|
| 8,419,526 | B1 | 4/2013 | Cannon |
| 2009/0247267 | A1 | 10/2009 | Acres |
| 2010/0304825 | A1 | 12/2010 | Davis |
| 2011/0003627 | A1 | 1/2011 | Nicely |
| 2012/0258790 | A1 | 10/2012 | Gomez |
| 2014/0274308 | A1 | 9/2014 | Guinn |
| 2015/0243134 | A1 | 8/2015 | Casey |

*Primary Examiner* — Lawrence S Galka
(74) *Attorney, Agent, or Firm* — The Culbertson Group, P.C.; Nathan H. Calvert

(57) ABSTRACT

A gaming machine, system, method, and program product provide a new slot machine game in which a gaming continuum displays advancement toward a highest state. The gaming continuum and includes a game activation display function that, based on a random selection associated with a wager activation, either partially advances the gaming continuum or totally advances the gaming continuum, the gaming continuum entering a decay state after each game outcome. The decay state includes displaying an advancing level of the gaming continuum decreasing toward an initial state. If a wager activation occurs before the initial state is reached, the level of the continuum is used as the starting state of the subsequent game round.

18 Claims, 8 Drawing Sheets

GAMING MACHINE AND METHOD HAVING PERSISTENT CONTINUUM FEATURE

CROSS-REFERENCE TO RELATED APPLICATIONS

This application is a continuation of U.S. patent application Ser. No. 16/706,683, filed Dec. 7, 2019, and titled "Wagering Gaming Machine and Method Having Persistent Continuum Feature," which application is a continuation of U.S. patent application Ser. No. 15/685,077, filed Aug. 24, 2017, and titled "Wagering Gaming Machine and Method Having Persistent Continuum Feature," now U.S. Pat. No. 10,504,329. The entire content of each of these prior applications is incorporated herein by this reference.

FIELD OF THE INVENTION

This invention relates to gaming systems and to gaming machines through which players may participate in wagering games, and in particular slot machine games with a feature game that provides persistent features.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all rights of copyright whatsoever.

BACKGROUND

Many different types of gaming machines have been developed to provide various formats and graphic presentations for conducting games and presenting game results. For many years, mechanical reel-type gaming machines, also known as slot machines, have been developed with different reel configurations, reel symbols, and paylines. More recently, gaming machines have been developed with video monitors that are used to produce simulations of mechanical spinning reels. These video-based gaming machines may use one or more video monitors to provide a wide variety of graphic effects in addition to simulated spinning reels, and may also provide secondary/bonus games using different reel arrangements or entirely different graphics. Many video-based gaming machines have three or five spinning reels that may be stopped to display a matrix of game symbols. The symbols displayed on the stopped reels correlate to a result of the game. Other games are also provided not based on reel displays, such as video poker, video keno or video versions of table games.

Game manufacturers are continuously pressed to develop new game presentations, formats, and game graphics in an attempt to provide high entertainment value for players and thereby attract and keep players. One such improvement is the use of persistent features that affect game results across multiple rounds of a game. What is needed are ways to provide both anticipation and excitement to players in activing such feature games and playing with persistent features.

SUMMARY OF THE INVENTION

The present invention includes wagering games, gaming machines, networked gaming systems that provide improvements to feature games played on slot machines or other gaming machines. A gaming machine, system, method, and program product provide a new slot machine game in which a gaming meter or continuum displays advancement toward a highest state. The gaming continuum and includes a game activation display function that, based on a random selection associated with a wager activation, either partially advances the gaming continuum or totally advances the gaming continuum, the gaming continuum entering a decay state after each game outcome. The decay state includes displaying an advancing level of the gaming continuum decreasing toward a lowest state. If a wager activation occurs before the lowest state is reached, the instantaneous level of the continuum is used as the starting state of the subsequent game round.

According to one aspect of the invention, a gaming machine includes a game cabinet in which is housed at least one electronic display and a player interface with buttons, one or more electronic controllers coupled to the electronic display and player interface, and tangible non-transitory computer readable memory coupled to the controllers, the memory holding program code executable by the controllers. The program code is executable for displaying conduct of a game and a player point total, and updating the point total as points are won in the game. It also provides a gaming continuum element operable for displaying a gaming continuum in a first display area and including a game activation display function that, responsive to a first player activation, randomly determines to either partially advance the gaming continuum or totally advance the gaming continuum, the gaming continuum entering a decay state between rounds of the game, the decay state including displaying an advancement level of the gaming continuum decreasing continuously over time toward an initial state until it either reaches the initial state or a subsequent player activation input occurs.

According to some implementations of the first aspect the program code is further executable for providing a game prize activator element operable for, after display of a totally advanced gaming continuum including a winning outcome, displaying an interaction of the gaming continuum with one or more of a group of displayed prize symbols indicating the one or more prize symbols are each associated with an awarded prize amount.

According to some implementations of the first aspect the game prize activator element is operable to display a game prize activator in a second display area above the first display area whenever a game round is being displayed, the game prize activator changing states depending on the state of the gaming continuum.

According to some implementations of the first aspect, a bonus round element is operable to, when activated, cause the game prize activator element to display an interaction with all of the prize symbols causing displayed prize amounts associated with each respective prize symbol to increase by an integer multiple, and then conduct a bonus game activation in which at least one totally advanced continuum with a winning outcome is provided.

According to some implementations of the first aspect, the subsequent game round display includes randomly determining an amount to advance of a remaining unadvanced portion of the gaming continuum to provide the subsequent losing game outcome.

According to some implementations of the first aspect, a decay rate of the gaming continuum is varied during the decay state to provide a constant total decay time across all decay states, independent of the gaming continuum state at the beginning of a current game round display.

According to some implementations of the first aspect, a decay rate of the gaming continuum is varied during the decay state.

According to some implementations of the first aspect, the gaming continuum element includes an audio element for causing a sound indicator to be played over speakers connected to the gaming machine when the gaming continuum is in the decay state, the sound indicator having a central frequency that varies in proportion to the advance level of the gaming continuum.

According to some implementations of the first aspect, the gaming continuum element is operable to persist during game presentations for multiple instances of the game.

In a second aspect of the invention, a method is provided for operating a game through a game cabinet in which is housed at least one electronic display and a player interface with buttons, the method performed by one or more electronic controllers executing program code held in tangible non-transitory computer readable memory coupled to the one or more controllers. The method includes displaying conduct of a game and a player point total, and updating the point total as points are won in the game, and displaying a gaming continuum having an advancement level in a first display area. Responsive to a first player activation input activating a round of the game, the method includes randomly determining to either partially advance the advancement level of the gaming continuum or totally advance the advancement level of the gaming continuum. The method includes causing the gaming continuum to enter a decay state after each game outcome, the decay state including displaying the advancement level of the gaming continuum decreasing at a decay rate over time toward an initial state until it reaches the initial state or a subsequent activation input occurs; and starting a subsequent game round with the advancement level of the gaming continuum at a different level than that provided at the conclusion of the prior game round.

According to some implementations of the second aspect, the method also includes after display of a totally advanced gaming continuum including a winning outcome, displaying an interaction of a game prize activator element with one or more of a group of displayed prize symbols indicating the one or more prize symbols are each associated with an awarded prize amount.

According to some implementations of the second aspect, the method also includes providing a bonus round element operable to, when activated, cause the game prize activator element to display an interaction with all of the prize symbols causing displayed prize amounts associated with each respective prize symbol to increase by an integer multiple, and then conduct a bonus game activation in which at least one totally advanced continuum with a winning outcome is provided.

According to some implementations of the second aspect, the game prize activator element displays a game prize activator in a second display area above the first display area whenever the gaming continuum is being displayed, the game prize activator changing states depending on the state of the gaming continuum.

According to some implementations of the second aspect, a subsequent game round display includes randomly determining an amount to advance of a remaining unadvanced portion of the gaming continuum to provide the subsequent losing game outcome.

According to some implementations of the second aspect, the decay rate is varied to provide a constant total decay time across all decay states, independent of the gaming continuum state at the beginning of a current game round display.

According to some implementations of the second aspect, the decay rate of the gaming continuum is varied during the decay state.

According to some implementations of the second aspect, the gaming continuum element includes an audio element for causing a sound indicator to be played over speakers connected to the gaming cabinet when the gaming continuum is in the decay state, the sound indicator having a central frequency that varies in proportion to the advance level of the gaming continuum.

According to some implementations of the second aspect, the gaming continuum persists during presentations for multiple instances of the game.

Another aspect of the invention is a gaming system that includes one or more gaming servers, and a group of electronic gaming machines connected to the servers by a network, programmed to provide one of more of the methods described herein. The various functionality described herein may be distributed between the electronic gaming machines and the gaming servers in any practically functional way. For example, the current preferred architecture is for the servers to determine all aspects of game logic, random number generation, and prize awards. The gaming machines provide functionality of conducting the game as seen by the player. However, other embodiments of course might use a thin client architecture in which the animation is also conducted by the server and electronic gaming machines serve merely as a terminal to receive button or touchscreen input from the player and to display graphics received from the server.

Different features may be included in different versions of the invention. These and other advantages and features of the invention will be apparent from the following description of the preferred embodiments, considered along with the accompanying drawings.

DETAILED DESCRIPTION OF PREFERRED EMBODIMENTS

Figure 1A:
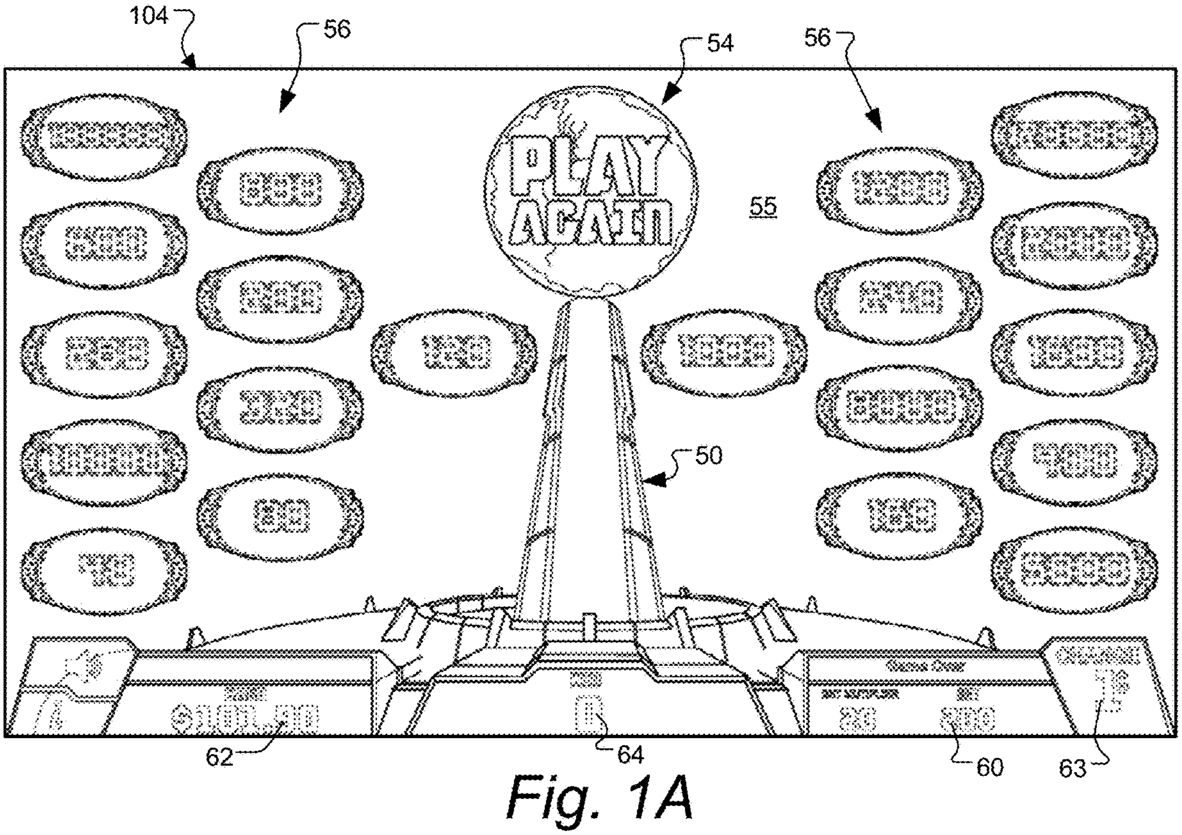
FIGS. 1A-1C are game screen diagrams illustrating a base game mode of a gaming machine primary display to illustrate an example slot machine display arrangement on which wagering game results are presented in a gaming area.
Figure 1B:
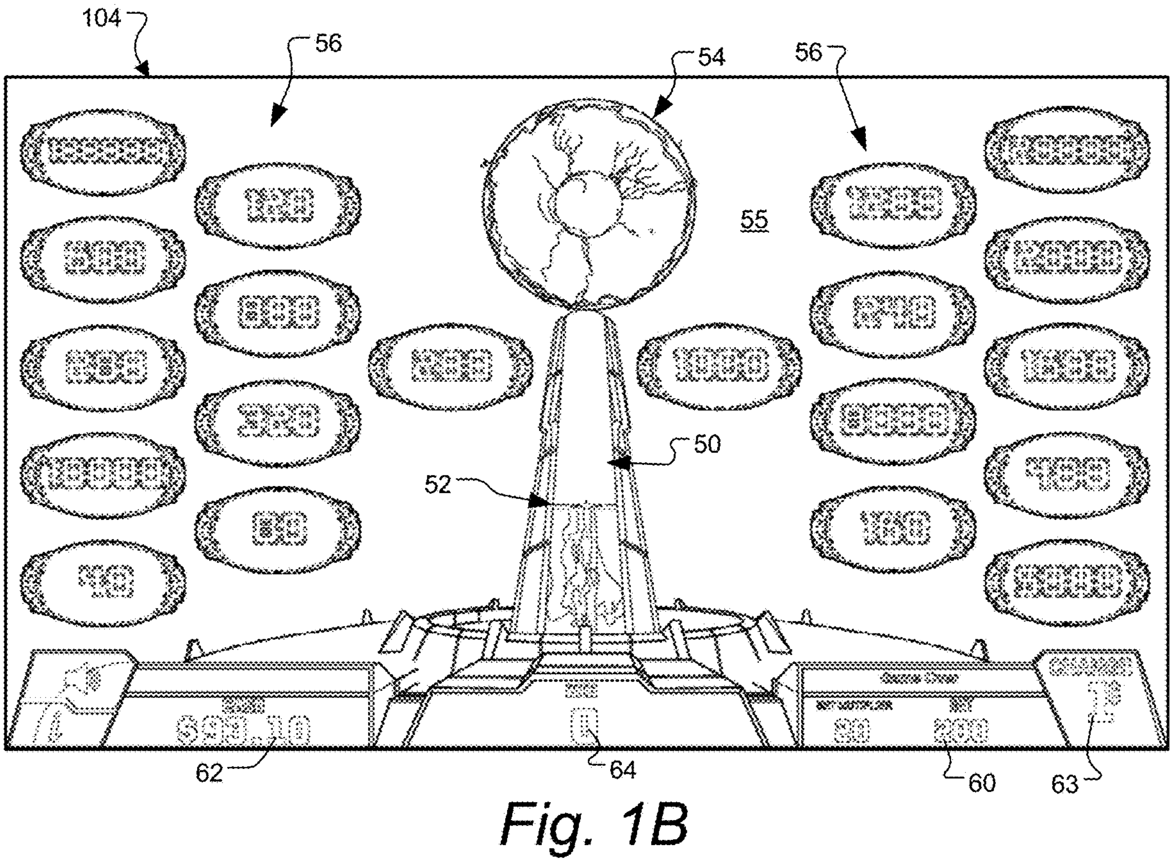
Figure 1C:
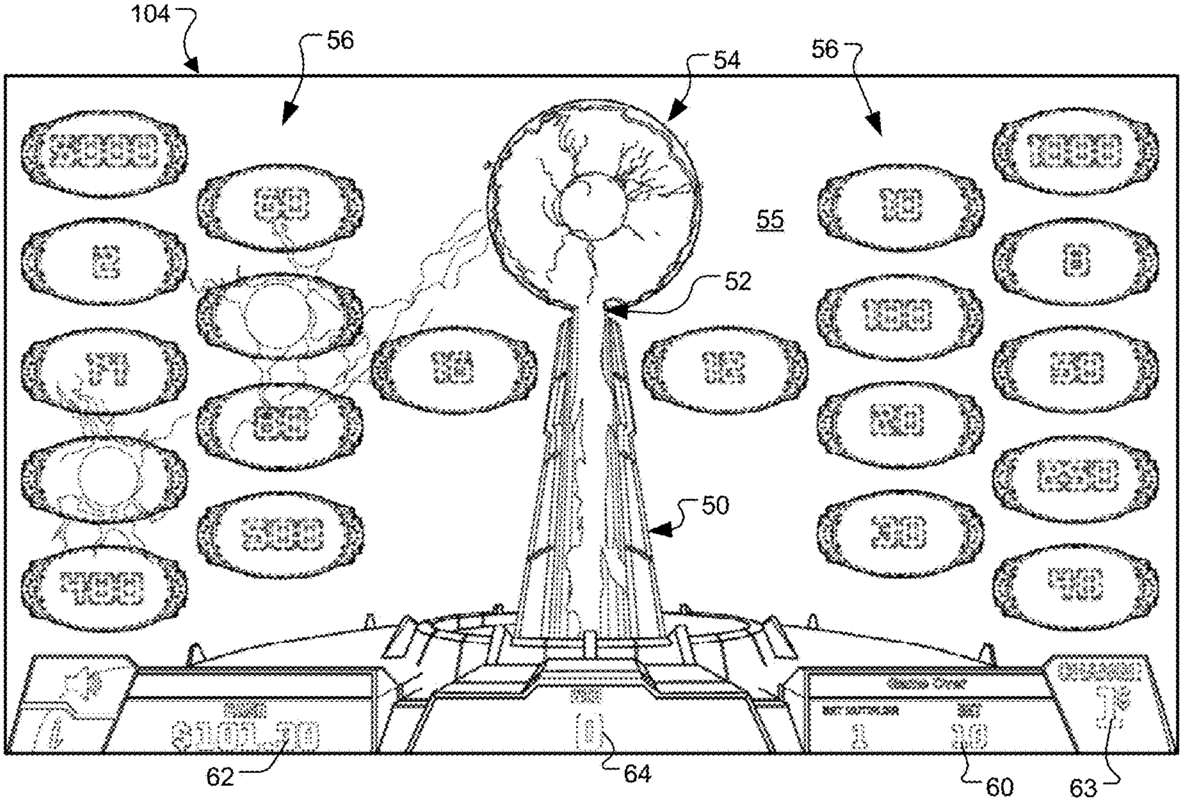

FIGS. 1A-1C are game screen diagrams illustrating a base game mode of a gaming machine primary display 104 to illustrate an example slot machine display arrangement on which wagering game results are presented in a gaming area 55. Background graphics may be displayed in gaming area 55 behind the depicted elements. For example, a preferred version shown in the screenshots of FIGS. 6A-6E shows a tunnel in perspective view as background graphics. Centrally located in the primary display 104 in a first display area of the gaming area is a gaming meter or continuum 50, displaying a fill level or advancement level 52, which is employed in the gaming process as described below. In FIG. 1A, the advancement level 52 is not shown because it is at the lowest state with no advancement, while in FIG. 1B the advancement level 52 is shown partially advanced along the gaming continuum 50. For winning results, the advancement level 52 reaches the most advanced state, in this example filled to the top of gaming continuum 50 to activate the prize activation element 54, which is depicted at the top of gaming meter 50 in a second display area. Prize activation element 54 displays interaction with prize symbols in preferred embodiments, in this version showing electrical arcing or lighting from the prize activation element 54 to selected prize symbols 56 to activate the prize symbols, as further described below. In this embodiment, a group of displayed prize symbols 56 is depicted around the gaming meter 50 and prize activation element 54. These prize symbols show credit amounts which are awarded if the prize symbol is activated. While this version includes prize symbols that display their associated awards, other versions may have other types of prize symbols that do not display an award, or which are not continuously displayed during game play but instead only appear temporarily. Below the gaming area, the wager credit denomination is shown in box 63 on the lower right. Left of this is box 60, which displays the current wager and amount wagered per game round. Left of this is win box 64, which displays the player's last awarded winnings. To the left of box 64 is box 62, which displays the current credits in the player's account.

Figure 2:
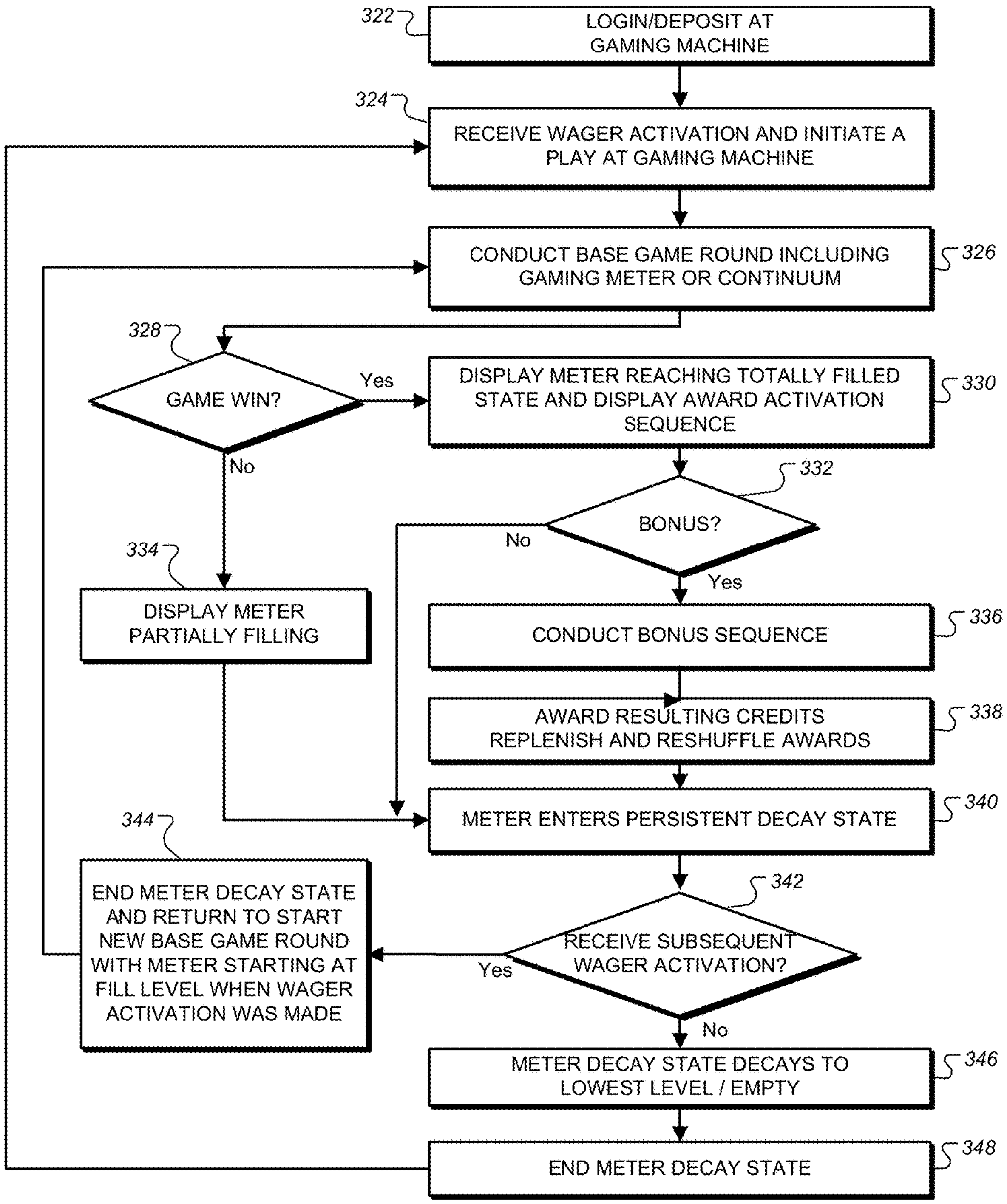
FIG. 2 is a flowchart showing a process for providing the feature game selection according to one or more embodiments of the invention.

FIG. 2 is a flowchart showing a process for providing the persistent meter wagering game according to one or more embodiments of the invention. Generally, the process is a method of providing a wagering game, the method conducted under control of one or more electronic processors to present gaming results on one or more displays on a gaming machine such as those described below. The process generally shows the control steps conducted by the programmed gaming machine, and may include steps conducted on a gaming server such as conducting the randomized parts of the game. Further, while example software flowcharts are shown herein, this is not limiting and many other software designs can achieve the same effect. The process starts at block 322 where a player logs in or deposits money or a credit voucher at a gaming machine. This is typically done through the currency/voucher acceptor and printer 112 (FIG. 3), but may be done with an account login made through entering credentials on a touchscreen or scanning a player card on a card reader input, which may be part of the currency/voucher acceptor. This block also includes displaying a player credit total, which is updated as credits are wagered and won in the wagering game. To begin a game play, the method receives a wager activation on a player input device at the gaming machine at block 324, which typically consists of some input from the player to set the amount to be wagered from their credit amount on the machine. The wager amount may also be carried over from previous game rounds by simply starting the game with the previous wager amount set. This typically happens through a 'Play' button on the game cabinet or touchscreen display, and serves to place the wager and start a single round of game play in the base game at block 326.

Figure 6A:
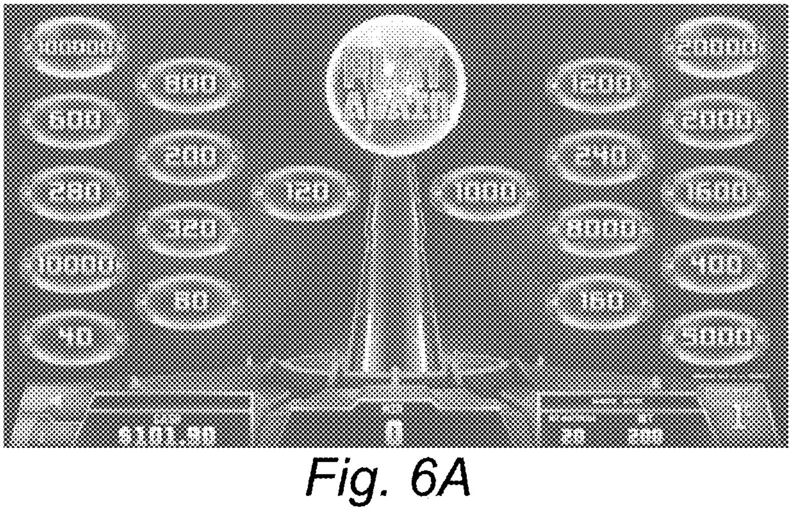
FIGS. 6A-6E are a series of game screen views showing the progression of a game round according to an example embodiment.
Figure 6B:
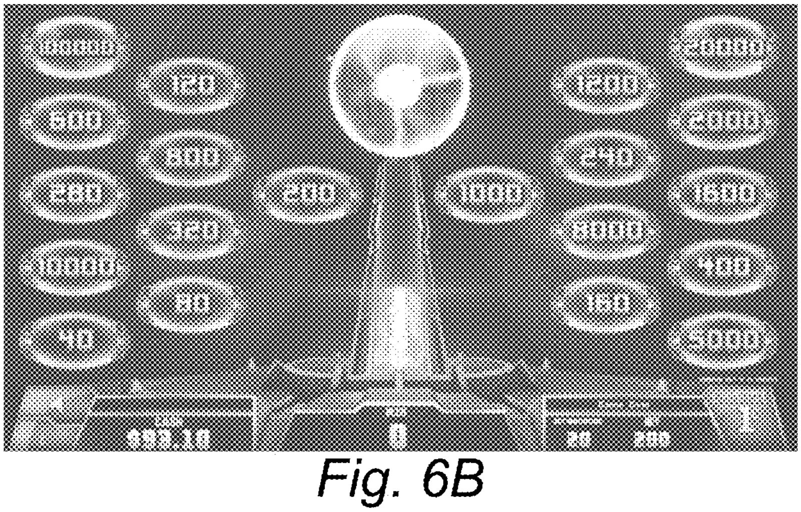

In prior games having reel displays or simulated reels, the game play is conducted by spinning the reels; however with the gaming meter feature employed in the various embodiments herein, a reel display is not required for the base game display. Note that preferably the gaming meter is placed as the primary means of communicating the game play of the base game in the embodiments herein, as can be seen in the example sequence of game screens depicted in FIGS. 6A-6E. The example game at this point is shown in FIG. 6A before a wager is activated. In response to the wager activation, at block 326 the random outcome is determined at this step as appropriate for the game. The process at block 326 includes providing a gaming meter element operable for displaying a gaming meter in a first display area. The preferred version generates at least one random number and uses the at least one random number to determine how the gaming meter will fill or advance, and if a winning outcome is achieved at block 238, and if so determine a set of one or more awards to be the activated on the base game screen. In this embodiment, the meter is provided as a vertical bar which is depicted as being filled and emptied as the game progresses. The gaming meter element also includes a game activation display function that, based on a random selection associated with a first player wager activation, either partially fills the gaming meter to provide a losing game outcome as shown at block 334 or totally fills the gaming meter as shown at block 330 to provide a winning game outcome. FIG. 6B shows an example game screen with the meter filling.

Figure 6C:
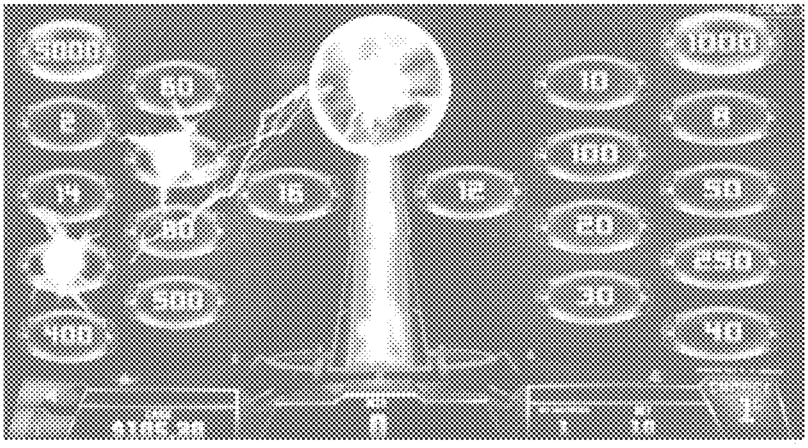
Figure 6D:
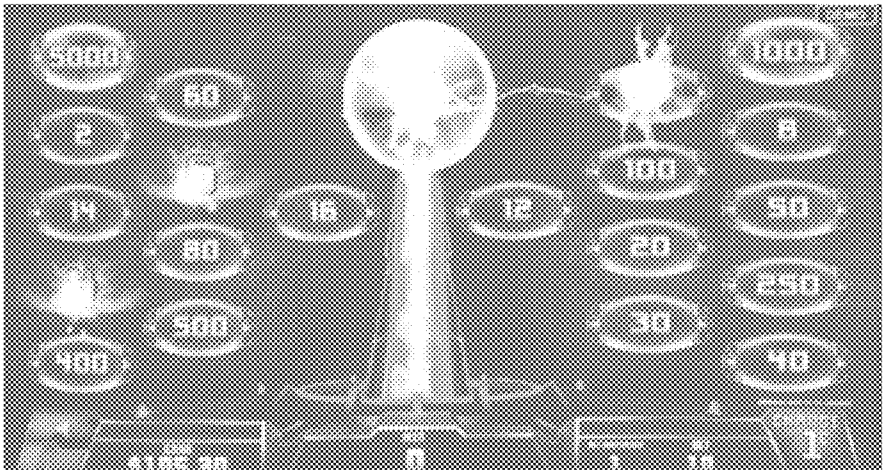
Figure 6E:
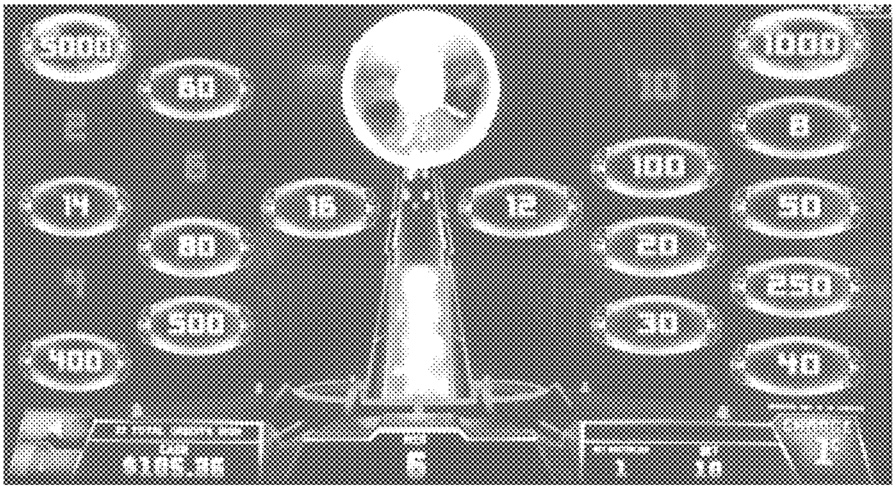

The process also includes providing a game prize activator element, labeled 54 in FIG. 1, operable for displaying award activation sequence at block 330. This block is preferably conducted by, after display of a totally filled gaming meter comprising a winning outcome, displaying an interaction with one or more of a group of displayed prize symbols indicating the one or more prize symbols are each associated with an awarded prize amount. Such an interaction for the example game is shown in FIGS. 6C and 6D, in which arcs of electricity are depicted as interacting with the game symbols to award the credit amount associated with the respective game symbol. In this example, the interaction is a display of lightning or electrical arcing from prize activator element 54, which is displayed to resemble a tesla coil top load or a charged power source, with the lighting reaching each activated prize symbol 56. The symbols are shown as activated or consumed by the interaction, and the process credits each awarded prize amount to the displayed credit total and to the active credit account.

After each game outcome, the gaming meter enters a decay state as shown at block 340, the decay state including displaying a fill level of the gaming meter decreasing toward an empty state or lowest state. An example of the decay state is depicted in the game screen of FIG. 6E, in which the gaming meter fill level, or more generally the gaming continuum advancement level is moving downward after credits are awarded for a winning game outcome. Preferably, the decay state is persistent; meaning the effect of the gaming meter level reached in the display state persists into the next game round start, if a subsequent wager activation is received at block 342 before the gaming meter has reached the empty or lowest state at block 346. That is, in response to a subsequent player wager activation occurring while the gaming meter is in the decay state and has not yet reached the empty state, the process begins a subsequent game round display with the gaming meter starting at its level in the decay state when the subsequent wager activation occurred, as shown at block 334. The subsequent game round proceeds similarly to the prior game round, but with the gaming meter starting the process at the prior level above empty or the lowest level instead of starting at empty. The subsequent game round then, based on a random selection associated with the subsequent player wager activation, either partially filling a remaining unfilled portion of the gaming meter to provide a subsequent losing game outcome or totally filling the remaining unfilled portion of the gaming meter to provide a subsequent winning game outcome, and again entering the decay state after each game outcome, as it goes through the depicted steps 326-340. As can be understood, the process goes through game round in response to each wager, which may begin with the gaming meter or continuum at the empty or lowest state if it is the first wager by the player or if the gaming meter or continuum is allowed to decay to the lowest state, or a wager activation is received at block 342 while the meter is still in the decay state, the subsequent game round begins at block 326 with the meter or continuum at some level above the empty or lowest level, the level it had when the wager activation was received in response to the player pressing the play button.

While a gaming meter displayed by a gaming meter element is described as the preferred version, this is not limiting and other embodiments may follow a similar process while providing the display and persistent effect based on when the subsequent wagers are received by using other types of advancing or progressing elements arranged or moving within a continuum that is not necessarily depicted as a meter. Such a gaming continuum may include a continuous analog advancement or stepwise or discretely segmented advancement. While preferably the display depicts advancement as movement in the upward direction on the display, this is also not limiting and other directions may be used such as sideways, down, or circumferential or radial movement within a circle or oval. According to such embodiments, the process includes providing a gaming continuum element operable for displaying a gaming continuum in a first display area and including a game activation display function that, based on a random selection associated with a first player wager activation, either partially advancing the gaming continuum to provide a losing game outcome or totally advancing the gaming continuum to provide a winning game outcome, the gaming continuum entering a temporary decay state after each game outcome, the decay state including displaying an advancement level of the gaming continuum decreasing toward a lowest state. The gaming continuum element is further operable for providing a persistent effect in a subsequent game round conducted in response to a subsequent player wager activation for any game round in which a subsequent wager activation occurs while the gaming continuum is in the temporary decay state. The persistent effect includes beginning a subsequent game round display with the gaming continuum starting at its level in the decay state when the subsequent wager activation occurred, thereby conducting the subsequent game round by, based on a random selection associated with the subsequent player wager activation, either partially advancing the gaming continuum to provide a subsequent losing game outcome or totally advancing the gaming continuum to provide a subsequent winning game outcome, and again entering the decay state after each game outcome;

Referring to partially filling the gaming meter, or partially advancing the gaming continuum, at block 334, in subsequent game rounds in which a subsequent gaming activation is received while the meter or continuum is in the decay state, this block partially fills or advances in the unfilled region of the gaming meter or continuum. In some versions, partially filling a remaining unfilled portion of the gaming meter or continuum further comprises filling or advancing a selected percentage of the unfilled portion based on the random selection.

In some versions, the gaming meter or continuum has a variable decay rate in the decay state. Typically a variable decay rate will decay faster toward the beginning of the decay state, and slower toward the end of the decay state. In some versions, the decay rate is varied in such a way as to provide a constant total decay time across all decay states, independent of the initial meter state. For example, one version ensures that the decay state completes in 1.7 seconds, no matter what level the meter or continuum has when the decay state begins. In such case, the average rate of decay is determined by dividing the total distance to decay to empty, zero, or the lowest possible level by 1.7 seconds. Such a decay rate may be adjusted to faster or slower in different periods within the decay state if a variable decay rate is used.

In some embodiments, the gaming meter element includes an audio element for causing a sound indicator to be played over speakers connected to the gaming machine when the gaming meter is in the decay state, the sound indicator having a central frequency that varies in proportion to the fill level of the gaming meter or continuum. For example, in one version, when the meter enters the decay state, a sound such as an engine revving or a motor turning at a high rpm rate is played, and the sound adjusted between a high main frequency at the top of the gaming meter or continuum, and a low main frequency toward the bottom, empty, or least advanced state of the gaming meter or continuum.

In some embodiments, the process also includes providing a bonus round element operable to, when activated as shown at block 332, cause the game prize activator element to conduct a bonus sequence at block 334 including displaying an interaction with all of the prize symbols causing displayed prize amounts associated with each respective prize symbol to increase by an integer multiple, and then conduct a bonus game activation in which at least one totally filled meter with a winning outcome is provided. Credits are awarded for the bonus sequence at block 336. After any bonus sequence, or if there is no bonus, the process goes to block 338 where the gaming meter or continuum enters the decay state as previously described.

While a sequential flowchart is shown to describe an example process, this is not limiting and typically a software architecture will be an object oriented design, or similar event driven design, in which user input and game process events cause software objects such as the gaming meter elements, gaming continuum elements, and result activator element to perform tasks in response.

Figure 3:
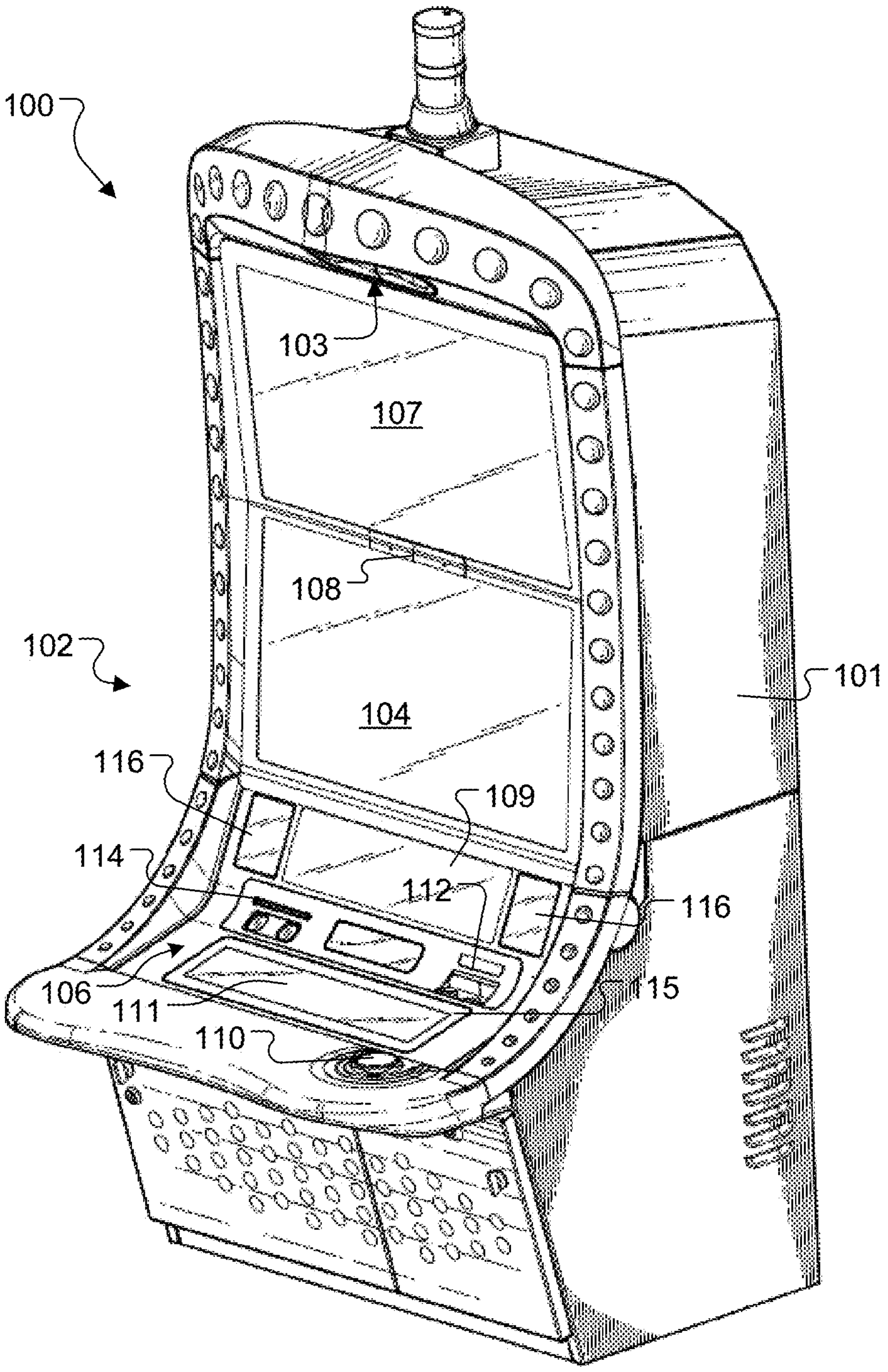
FIG. 3 is a front perspective view of a gaming machine which may be used in a gaming system embodying the principles of the present invention.
Figure 4:
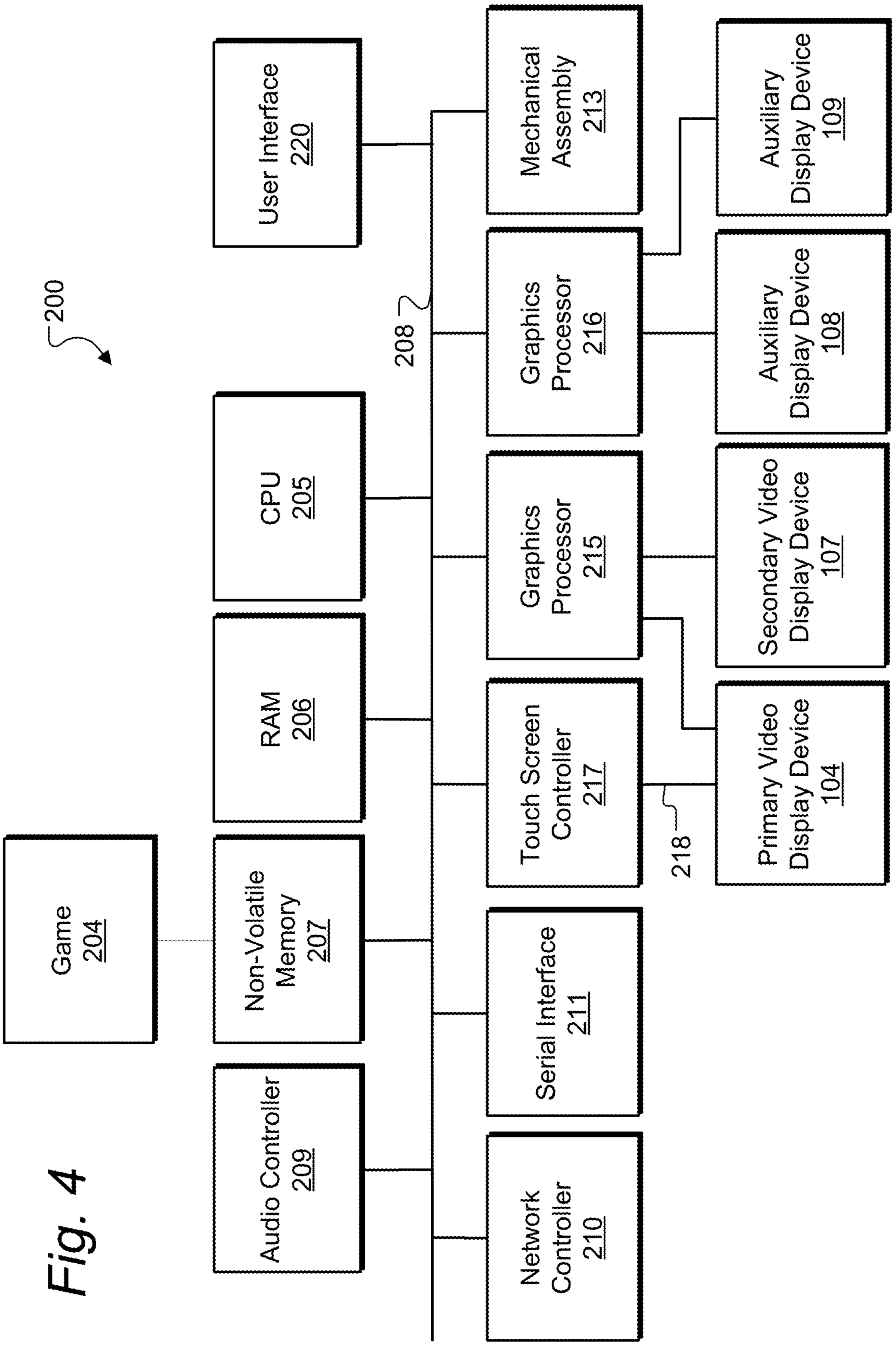
FIG. 4 is a block diagram showing various electronic components of the gaming machine shown in FIG. 3 together with additional gaming system components.

The invention may also be embodied as a gaming machine, such as the example machine depicted in FIG. 3 or the machine of FIG. 4. The particular technical architecture is not important as many special purpose gaming cabinets and gaming machines are known in the art. Generally such versions provide a gaming machine for providing a wagering game, including a game cabinet in which is housed at least one electronic display, currency-voucher acceptor, and a player interface with buttons. The gaming machine may be constructed according to the example hardware block diagram of FIG. 4, or other suitable designs, is controlled by one or more electronic controllers coupled to the electronic display, currency-voucher acceptor and player interface, tangible non-transitory computer readable memory coupled to the controllers, the memory holding program code executable by the controllers for performing the process described above or variations thereof.

Further, some versions of the invention may be embodied as the system computer program code, executable by a gaming machine or gaming network processor, as described herein are preferably executed by a Class III gaming machine which conducts all random number generation on the gaming machine itself as further discussed below. It should be understood that this is only one example embodiment, and other versions may divide the processing tasks of the game method in a different manner. For example, some systems may employ a thin client architecture in which practically all of the processing tasks are performed at the game server, and only display information for the player interface transmitted to the electronic gaming machine. In such an embodiment, only the steps involving player input or display are performed by the electronic gaming machine, with the remaining steps performed by one of the game servers in the system. In such a case, though, the software architecture is preferably designed as a thin client in which a dedicated virtual machine running on the game server (or a virtual machine server connected in the gaming network) performs the tasks designated in the present drawing as occurring "at the gaming machine." In the depicted flowcharts, the method is performed by the respective computer hardware operating under control of computer program code stored in tangible, non-transitory memory on the gaming machine and/or one or more of the system servers in client/server or thin client embodiments. While central processor arrangements may vary (for example award controllers may be integrated on the same machine with a gaming server, or may be a separate server connected on a secure network), the particular central determinant architecture is not limiting and will be referred to generally in this drawing as the game server (i.e. 403). As shown at block 324 in FIG. 2, the method performed at the game server further includes receiving game play requests originating from electronic gaming machine 100, and sending commands to the gaming machine to show the gaming meter or continuum implementing the game, and results being displayed. The division of game logic steps between gaming machines and servers is known in the art and may be accomplished according to suitable methods allowed for the relevant gaming jurisdictions.

Figure 5:
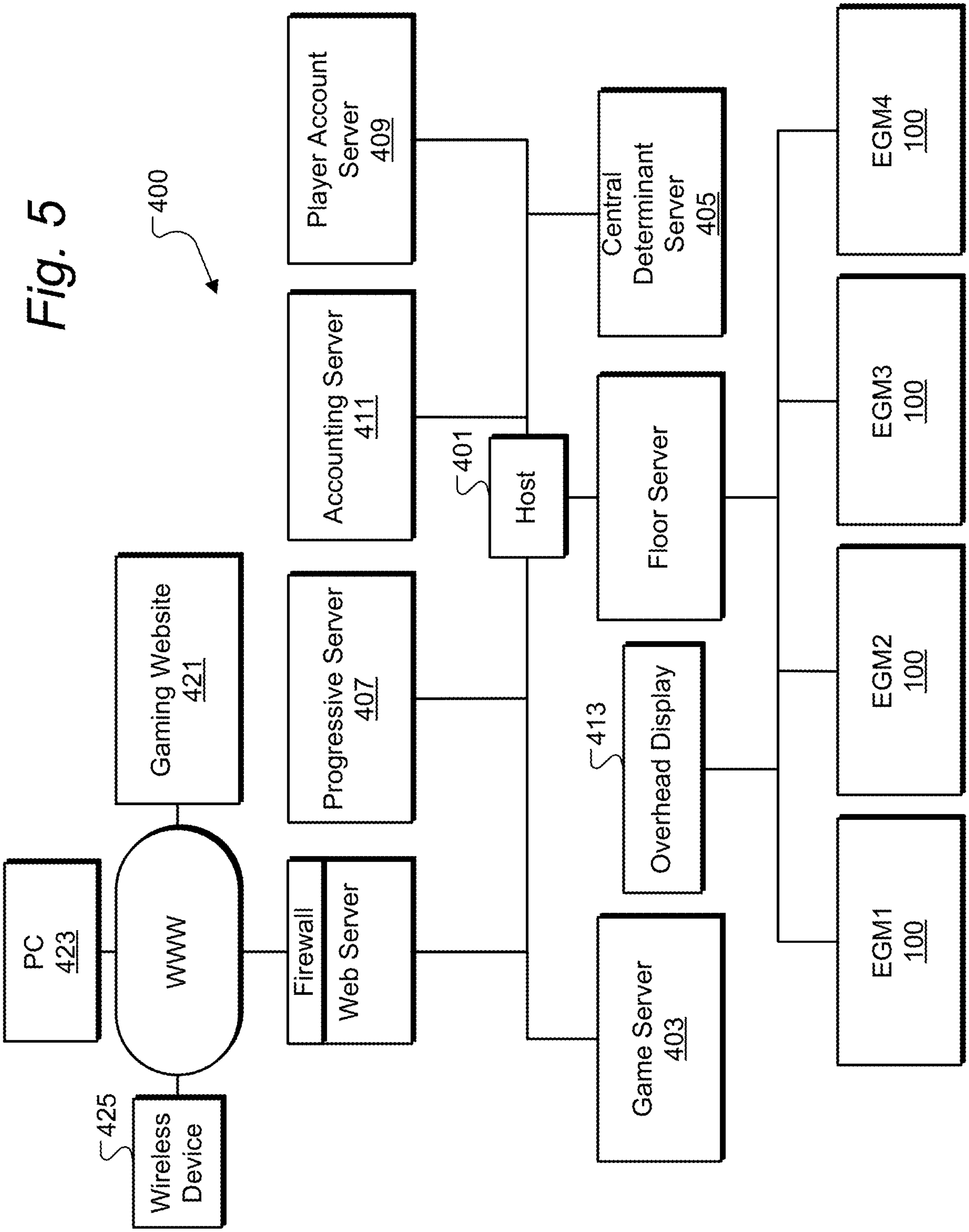
FIG. 5 is a system block diagram of a gaming system according to another embodiment of the invention.

FIG. 3 is a perspective view of a gaming machine 100 that may be used to implement feature games according to the present invention. The block diagram of FIG. 5 shows further details of gaming machine 100. Referring to FIG. 3, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. One or more lamps 103 are mounted under a top lip of cabinet 101 to illuminate the ledge 106. Gaming machine 100 may also include two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 3 also includes a of mechanical control button 110 mounted toward the front right side on ledge 106, which is a play button for activating wagers and game rounds. A touch screen button interface 111 mounted centrally along the ledge 106 also presents additional control buttons which may allow a player to select a bet level, select paylines, select a type of game or game feature, for example. Such button controls may instead be provided as mechanical buttons on ledge 106. Further, primary video display device 104 in gaming machine 100 provides a convenient display device for implementing touchscreen controls. It will be appreciated that gaming machines may also include a number of other player interface devices in addition to devices that are considered player controls for use in playing a particular game. The ledge may also include a hardware special object including a button, touch sensor, or switches, joysticks, or other mechanical input devices, and/or virtual buttons and other controls implemented on a suitable touchscreen video display.

Gaming machine 100 also includes a currency/voucher acceptor having an input ramp 112, a player card reader having a player card input 114, and a voucher/receipt printer having a voucher/receipt output which may near or integrated with the currency/voucher acceptor 112 or near or integrated with the player card input 114. A pair of cash out and service buttons are positioned below player card input 114. Audio speakers 116 generate an audio output to enhance the user's playing experience. Numerous other types of devices may be included in gaming machines that may be used according to the present invention.

FIG. 4 shows a logical and hardware block diagram 200 of gaming machine 200 which includes a central processing unit (CPU) 205 along with random access memory 206 and nonvolatile memory or storage device 207. All of these devices are connected on a system bus 208 with an audio controller 209, a network controller 210, and a serial interface 211. A graphics processor 215 is also connected on bus 208 and is connected to drive primary video display device 104 and secondary video display device 107 (both mounted on cabinet 101 as shown in FIG. 3). A second graphics processor 216 is also connected on bus 208 in this example to drive the auxiliary display devices 108 and 109 also shown in FIG. 3. As shown in FIG. 4, gaming machine 200 also includes a touch screen controller 217 connected to system bus 208. Touch screen controller 217 is also connected via signal path 218 to receive signals from a touchscreen element associated with primary video display device 104. It will be appreciated that the touchscreen element itself typically comprises a thin film that is secured over the display surface of primary video display device 104. The touchscreen element itself is not illustrated or referenced separately in the figures.

Those familiar with data processing devices and systems will appreciate that other basic electronic components will be included in gaming machine 200 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 3 are known in the art of gaming cabinet and gaming machine design. Those familiar with data processing systems and the various data processing elements shown in FIG. 4 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 4 as being connected directly on system bus 208 may in fact communicate with the other system components through a suitable expansion bus. Audio controller 209, for example, may be connected to the system via a PCI bus. System bus 208 is shown in FIG. 4 merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. In some embodiments, the persistent event meter 1506 may be displayed on secondary video display 107 rather than beside the matrix of symbol locations or other type of primary gaming zone on the primary display. The invention is not limited to any particular arrangement of processing devices for controlling the video display device included with gaming machine 200. Also, a gaming machine implementing the present invention is not limited to any particular number of video display devices or other types of display devices.

In the illustrated gaming machine 200, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine, and may also implement a game client for directing one or more display devices at the gaming machine to display the feature game mode according to the present invention. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs, while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 200 is included.

It should also be noted that the invention is not limited to gaming machines including only video display devices for conveying results. It is possible to implement a persistent gaming meter game within the scope of the present invention using an electro mechanical arrangement or even a purely mechanical arrangement for displaying gaming meter or gaming continuum and its associated functionality as described herein. For example, a gaming machine suitable for providing a persistent gaming meter game may include a mechanical meter or a rolling or moving device rather than a video-type display device for displaying results in a persistent meter game, and include a video display device for presenting the base game separately.

Still referring to the hardware and logical block diagram 200 showing an example design for a gaming machine 100, the depicted machine in operation is controlled generally by CPU 205 which stores operating programs and data in memory 207 with wagering game 204, user interface 220, network controller 210, audio/visual controllers, and mechanical assembly 213 (if a mechanical structure is employed for the gaming meter element and/or the prize activator element). CPU or game processor 205 may comprise a conventional microprocessor, such as an Intel microprocessor, mounted on a printed circuit board with supporting ports, drivers, memory, software, and firmware to communicate with and control gaming machine operations, such as through the execution of program code stored in memory 207 including one or more wagering games 204 such program code for the various embodiments described herein. Game processor 205 connects to user interface 220 such that a player may enter input information, and game processor 205 may respond according to its programming, such as to apply a wager and initiate execution of a game.

Game processor 205 also may connect through network controller 210 to a gaming network, such as example casino server network 400 shown in FIG. 5. Referring now to FIG. 5, the invention may be embodied as a system including one or more gaming machines connected through a network to supporting servers such as those depicted. The casino server network 400 may be implemented over one or more site locations and include host server 401, gaming server 403, which can also function as a remote game play server (configured to provide game processor functionality including determining game outcomes and providing audio/visual instructions to a remote gaming device), central determinant server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards.

System 400 includes a number of gaming machines 100 in this example implementation. For purposes of describing system 400, each gaming machine 100 in FIG. 4 includes a video display device 107 and a player interface that may include buttons, switches, or other physical controls and/or touchscreen controls as discussed above in connection with FIG. 4. Other gaming cabinet, tabletop, and mobile device architectures may, of course, be used. System 400 further includes a game server 403 and a respective game client software package included with each respective gaming machine 100. In the form of the invention shown in FIG. 4, these two components, game server 403 and the game client components, combine to implement a game control arrangement which will be described in detail below. System 400 also includes a central determinant server 405, which may provide random numbers under legally regulate conditions, and is associated with game server 403, though the two servers may be implemented through a common data processing device/computer system or in separate devices. Gaming machines 100, game server 403, and determinant servers 405 are connected through the depicted network. The present invention is not limited to any particular communications arrangement for facilitating communications between game server 403 and various gaming machines 100. Any wired or wireless communication arrangement employing any suitable communications protocols (such as TCP/IP for example) may be used in an apparatus according to the invention.

In embodiments where game results are provided over the network, or in "thin client" embodiments, the game control arrangement made up of game server 403 and the respective game client at a given gaming machine 100 functions to control the respective video display device for that gaming machine to display the base and bonus games herein. Game server 403 is responsible for awarding prizes for a player's participation in a wheel enhancement feature game, and maintaining progressive prize information where the wheel enhancement game offers one or more progressive prizes. It should be noted that the game control arrangement may be implemented in some embodiments entirely on the gaming machine. This is especially true in jurisdictions that allow Class III gaming conducted with random number generators at each gaming machine. In other embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Progressive prizes may be made available to be won through the persistent meter game, typically requiring a qualifying bet to eligible, and may be awarded as mystery-type award or as part of a bonus, for example, in which multiple gaming meters or continuums are displayed which are filled in a series or in parallel to win a progressive bonus. Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Apple iPhone, Android phone, tablet, phablet, virtual reality device, iPad, etc.). To enter the website, a player may log in with a username (that may be associated with the player's account information stored on player account server 409 or be accessible by a casino operator to obtain player data and provide promotional offers), play various games on the website, make various personalizing selections and save the information, so that during a next gaming session at a casino establishment, the player's playing data and personalized information may be associated with the player's account and accessible at the player's selected gaming machine 100.

Referring generally to the description herein, any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A gaming machine comprising:

a game cabinet in which is housed at least one electronic display and a player interface with buttons;

one or more electronic controllers coupled to the electronic display and player interface;

tangible non-transitory computer readable memory coupled to the one or more electronic controllers, the memory holding program code executable by the one or more electronic controllers for:

displaying conduct of a game and a player point total, and updating the player point total as points are won in the game; and providing a gaming continuum element operable for displaying a gaming continuum in a first display area and including a game activation display function that, responsive to a first player activation, randomly determines to either partially advance the gaming continuum or totally advance the gaming continuum, the gaming continuum entering a decay state between rounds of the game, the decay state including displaying an advancement level of the gaming continuum decreasing continuously over time toward an initial state until it either reaches the initial state or a subsequent player activation input occurs.

2. The gaming machine of claim 1, in which the program code is further executable for providing a game prize activator element operable for, after display of a totally advanced gaming continuum comprising a winning outcome, displaying an interaction of the gaming continuum with one or more of a group of displayed prize symbols indicating the one or more prize symbols are each associated with an awarded prize amount.

3. The gaming machine of claim 2, in which the game prize activator element is operable to display a game prize activator in a second display area above the first display area whenever a game round is being displayed, the game prize activator changing states depending on the state of the gaming continuum.

4. The gaming machine of claim 2, further comprising a bonus round element operable to, when activated, cause the game prize activator element to display an interaction with all of the prize symbols causing displayed prize amounts associated with each respective prize symbol to increase by an integer multiple, and then conduct a bonus game activation in which at least one totally advanced continuum with provided with a winning outcome.

5. The gaming machine of claim 1, wherein a subsequent game round display includes randomly determining an amount to advance of a remaining unadvanced portion of the gaming continuum to provide a subsequent losing game outcome.

6. The gaming machine of claim 1, in which a decay rate of the gaming continuum is varied during the decay state to provide a constant total decay time across all decay states, independent of the state of the gaming continuum at a beginning of a current game round display.

7. The gaming machine of claim 1, in which a decay rate of the gaming continuum is varied during the decay state.

8. The gaming machine of claim 1, in which the gaming continuum element includes an audio element for causing a sound indicator to be played over speakers connected to the gaming machine when the gaming continuum is in the decay state, the sound indicator having a central frequency that varies in proportion to the advance level of the gaming continuum.

9. The gaming machine of claim 1, wherein the gaming continuum element is operable to persist during game presentations for multiple instances of the game.

10. A method of operating a game through a game cabinet in which is housed at least one electronic display and a player interface with buttons, the method performed by one or more electronic controllers executing program code held in tangible non-transitory computer readable memory coupled to the one or more electronic controllers, the method comprising:

displaying conduct of a game and a player point total, and updating the player point total as points are won in the game;

displaying a gaming continuum having an advancement level in a first display area;

responsive to a first player activation input activating a round of the game, randomly determining to either partially advance the advancement level of the gaming continuum or totally advance the advancement level of the gaming continuum;

causing the gaming continuum to enter a decay state after each round of the game, the decay state including displaying the advancement level of the gaming continuum decreasing at a decay rate over time toward an initial state until it reaches the initial state or a subsequent activation input occurs; and starting a subsequent game round with the advancement level of the gaming continuum at a different level than that provided at a conclusion of a prior game round.

11. The method of claim 10, further comprising, after display of a totally advanced gaming continuum comprising a winning outcome, displaying an interaction of a game prize activator element with one or more of a group of displayed prize symbols indicating the one or more prize symbols are each associated with an awarded prize amount.

12. The method of claim 11, further comprising providing a bonus round element operable to, when activated, cause the game prize activator element to display an interaction with all of the prize symbols causing displayed prize amounts associated with each respective prize symbol to increase by an integer multiple, and then conduct a bonus game activation in which at least one totally advanced continuum is provided with a winning outcome.

13. The method of claim 11, in which the game prize activator element displays a game prize activator in a second display area above the first display area whenever the gaming continuum is being displayed, the game prize activator changing states depending on the state of the gaming continuum.

14. The method of claim 10, wherein a subsequent game round display includes randomly determining an amount to advance of a remaining unadvanced portion of the gaming continuum to provide the subsequent losing game outcome.

15. The method of claim 10, in which the decay rate is varied to provide a constant total decay time across all decay states, independent of the state of the gaming continuum at a beginning of a current game round display.

16. The method of claim 10, in which the decay rate of the gaming continuum is varied during the decay state.

17. The method of claim 10, in which the gaming continuum includes an audio element for causing a sound indicator to be played over speakers connected to the gaming cabinet when the gaming continuum is in the decay state, the sound indicator having a central frequency that varies in proportion to the advance level of the gaming continuum.

18. The method of claim 10, wherein the gaming continuum persists during presentations for multiple instances of the game.

* * * * *